Patented July 7, 1931

1,813,109

UNITED STATES PATENT OFFICE

HENRY W. BANKS, 3D, OF NOROTON, CONNECTICUT

ANTISEPTIC COMPOSITION AND METHOD OF MAKING THE SAME

No Drawing. Application filed December 15, 1925. Serial No. 75,623.

This invention relates to halogenated antiseptic compositions of the class which is suitable for application to the skin or to the mucous membrane surfaces of the human body or to cuts or wounds therein and for all similar uses.

Among the principal objects of the invention is the provision of a halogenated antiseptic composition of the class just specified in the form of a staple paste or powder which can be applied directly in either of these forms or which can be first taken up with water and applied as a liquid in the usual manner.

A further object of the invention is the provision of a stable composition in paste form containing an oxy-halogen salt having the above mentioned desirable antiseptic properties and possessing also substantially all the desirable antiseptic and physiological properties of the antiseptic solution commonly known as Dakin's solution or as Carrel-Dakin solution and having also other desirable properties in addition thereto as will appear more fully from the description and from the examples to follow.

It will be understood that by a halogenated antiseptic, I mean any substance suitable for application as an antiseptic which contains available halogen, i. e., which is capable of liberating free halogen when exposed to suitable conditions such as moisture alone or moisture and an acid, or to any conditions which permit the evaporation or diffusion of free halogen from a solid, liquid, or adsorbed state into the surrounding space. Examples of such halogenated antiseptics are: sodium hypochlorite; solid iodine; liquid bromine; iodine derivative of bismuth gallate; iodoform; the compound of iodoform with hexamethylene-tetramine; hexamethylene tetramine tetraiodide; tetra-iodo-pyrrole; triiodo-meta-cresol; tetra-iodo-phenolphthalein; the compounds of iodine and bromine with fats; chloramine T and the like.

Prior to the present invention attempts have been made to prepare halogenated antiseptic substances such as those listed above in powdered or paste form but these prior products as a class possess certain disadvantages or objectionable characteristics which it is one of the objects of my invention to overcome.

For example, pastes prepared from a halogenated antiseptic substance and gelatine or agar agar or starch or like absorbents are very unstable due to the chemical action of free halogen upon these media, whereas when prepared with other absorbent media such as ordinary clay, infusorial earth and the like the resulting product frequently either does not possess the desired pasty or gelatinous consistency or is not sufficiently stable or cannot be taken up in water to form a homogeneous solution or colloidal dispersion or is not sufficiently homogeneous in composition or else possesses some other similar objectionable characteristic. Moreover the strength or concentration of many of these prior antiseptic powders or pastes cannot be readily or conveniently adjusted without encountering other serious difficulties.

Contrary to what one would naturally expect, the foregoing difficulties are largely or completely overcome by means of my invention according to which a halogenated antiseptic and an inorganic water-absorptive, jell-forming medium such as a bentonite clay are caused to interact upon each other in the manner hereinafter more fully specified.

I have discovered that the bentonite or like absorbent medium does not adversely affect the stability of the halogenated antiseptic substances to any serious extent either in a chemical or physical sense, notwithstanding the fact that many of these substances are known to be sensitive to the contact action of gelatinous or absorbent media in general and tend to become unstable under such action.

Furthermore I have discovered that the desirable paste-forming and water-absorptive properties of the bentonite or similar medium as well as its dispersability in water and desirable colloidal properties is not altered to any objectionable degree by the contact of chemical action of the halogenated substances or other constituents upon the medium, although this effect varies considerably according to the nature of the constituents and the method employed in combining or mixing them to produce the finished product.

The various other advantages and objects of my invention will be apparent from the following examples which illustrate a few embodiments of my invention but it will be understood that the invention is not restricted to the specific details of these examples but that various changes and substitutions may be made therein without departing from the scope of my invention is indicated by the claims appended hereto.

*Example 1.*—50 c. c. of solution containing about 2% sodium chloride and about 0.1% of available chlorine in the form of sodium hypochlorite is united with sufficient bentonite to form a stiff gelatinous paste. This mixture is thoroughly stirred in order to distribute the salts uniformly and thoroughly throughout the bentonite. The bentonite preferably should be substantially neutral or only slightly basic in reaction.

The product thus formed may be used as a paste or it may be dried down to a powder in any suitable manner and used as a dusting powder or it may be taken up with any desired proportion of water whereby a substantially homogeneous and fairly stable solution or colloidal dispersion is obtained which may be employed as a liquid antiseptic in the usual manner.

*Example 2.*—1 gram chloramine T is dissolved in 100 c. c. water, and the resulting solution is mixed with sufficient bentonite to form a stiff gelatinous paste. Or as little as 0.1 gram chloramine T or as much as 4 grams may be used but the 1% solution will be found to serve best in the majority of cases. The paste resulting from this procedure may be converted into powder or liquid as described in Example 1.

*Example 3.*—I may substitute for the chloramine T of Example 2 any other suitable organic chlorine derivative capable of furnishing free chlorine in a manner analogous to that of chloramine T. And I may dissolve this compound in an organic solvent such as benzol or carbon tetrachloride, and mix the resulting solution with the bentonite. Then by evaporation of the organic solvent a dry antiseptic dust containing from 0.1 to 5% or more of the organic chlorine derivative is obtained. This powder may be taken up with a limited proportion of water to form a paste or with a larger proportion to form a liquid as set forth in Example 1.

In the above examples the various constituents of the mixtures or the finished products themselves, if too basic, may be neutralized with a suitable acid such as boric acid, or, if too acid, with any suitable base according to procedures well known to those skilled in this art.

The term antiseptic as employed herein means any substance possessing an antiseptic or disinfecting power not substantially less than that possessed by chloramine T as determined by the Rideal Walker test. This test is described among other publications in "Preventive medicine and hygiene" by Milton J. Rosenau, 5th edition, 1927 on pages 1328 to 1335, published by D. Appleton & Company. In making the comparison of the relative antiseptic or disinfecting power of any given halogenated substance with chloramine T it will be understood that the amount of the given halogenated substance employed shall be such that it contains an amount of halogen by weight which is chemically equivalent to the weight of chlorine contained in the chloramine T with which a given halogenated substance is being compared.

In my copending application Serial No. 528,235, filed April 6th, 1931, the same being a division of the present application, I have discussed substantially the same subject matter as that contained in the present application and have claimed in the said divisional application certain subject matter not specifically claimed in the present application.

I claim:

1. An antiseptic composition comprising a water-absorptive, jell-forming bentonite clay and a halogenated antiseptic substance.

2. An antiseptic composition comprising a water-absorptive, jell-forming bentonite clay and an oxy-halogen salt.

3. An antiseptic composition comprising a water-absorptive, jell-forming bentonite clay, sodium hypochlorite and sodium chloride.

4. An antiseptic aqueous paste comprising a water-absorptive, jell-forming bentonite clay, and a fraction of a per cent of available halogen present as an oxy-halogen salt.

5. An antiseptic aqueous paste comprising a water-absorptive, jell-forming bentonite clay, and a fraction of a per cent of available halogen present as an oxy-halogen salt and from a fraction of a per cent to 20 per cent of halogen salt.

6. An antiseptic aqueous paste comprising a water-absorptive, jell-forming bentonite clay, and a fraction of a per cent of available halogen present as an oxy-halogen salt and about 2 per cent of a halogen salt.

7. An antiseptic composition comprising a water-absorptive, jell-forming bentonite clay, an oxy-halogen salt and a halogen salt.

In testimony whereof I affix my signature.

HENRY W. BANKS, 3d.